United States Patent [19]
Shull

[11] Patent Number: 5,353,293
[45] Date of Patent: Oct. 4, 1994

[54] HYBRID COOLED ION LASER

[75] Inventor: William A. Shull, Aptos, Calif.

[73] Assignee: Spectra-Physics Lasers, Inc., Mountain View, Calif.

[21] Appl. No.: 54,313

[22] Filed: Apr. 27, 1993

[51] Int. Cl.⁵ .............................................. H01S 3/04
[52] U.S. Cl. ...................... 372/34; 372/92; 372/35; 372/98
[58] Field of Search ............... 372/34, 5, 92, 35, 98; 165/182

[56] References Cited

U.S. PATENT DOCUMENTS

| | | | |
|---|---|---|---|
| 3,638,140 | 1/1972 | Knapp et al. | 372/34 |
| 3,753,144 | 8/1973 | Kearns et al. | 372/35 |
| 3,763,442 | 10/1973 | McMahan | 372/34 |
| 4,893,314 | 1/1990 | Shull et al. | 372/65 |
| 4,928,756 | 5/1990 | Shull et al. | 165/182 |

Primary Examiner—Leon Scott, Jr.
Attorney, Agent, or Firm—Haynes & Davis

[57] ABSTRACT

A high output, compact laser having a multi-line spectral output and an internal mirror, integral resonator design is disclosed. The laser structure comprises a laser tube containing a resonant cavity, an output coupler and an active medium. A power supply and coolant assembly are coupled to the laser tube. The coolant assembly is a hybrid coolant scheme wherein one portion of the tube is cooled by circulating water coolant, while another portion or portions are cooled by circulating air. In one aspect, the laser tube includes a ceramic bore surrounded by a sheath sealed at a first end and a second end of the ceramic bore, and coolant is provided between the sheath and the bore. In a further aspect, forced air is directed over a reservoir portion of the tube. The reservoir portion may be manufactured from a metallic alloy comprised of nickel iron cobalt with copper cooling fins brazed to the reservoir to increase thermal cooling efficiency and isothermal distribution of heat.

28 Claims, 4 Drawing Sheets

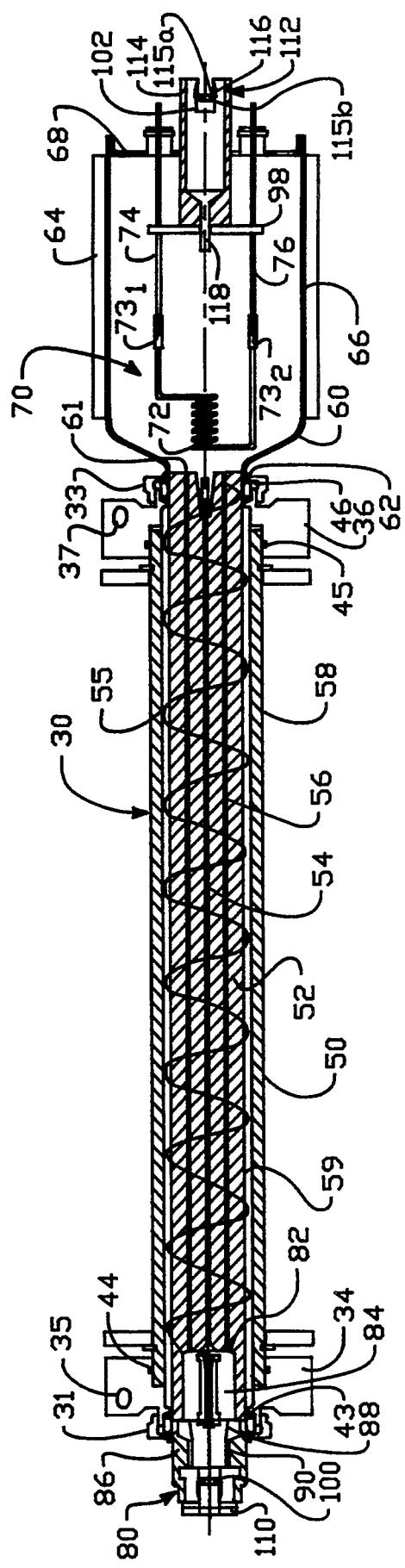
FIG.—3

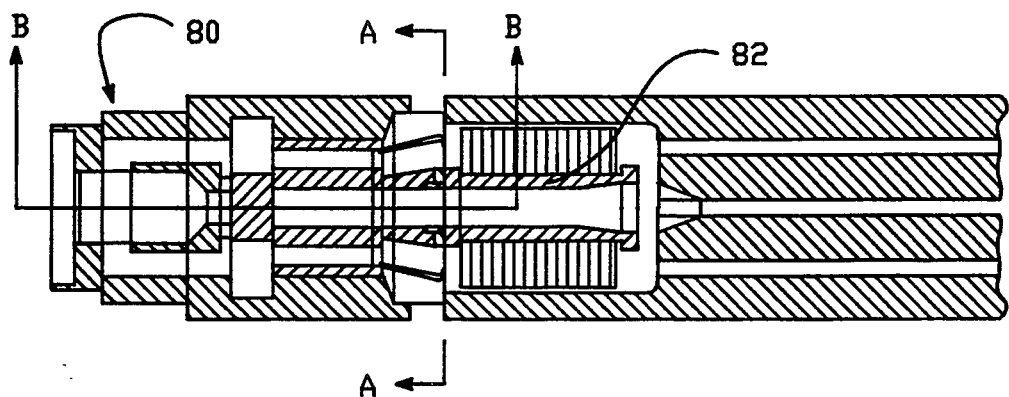
FIG.—4
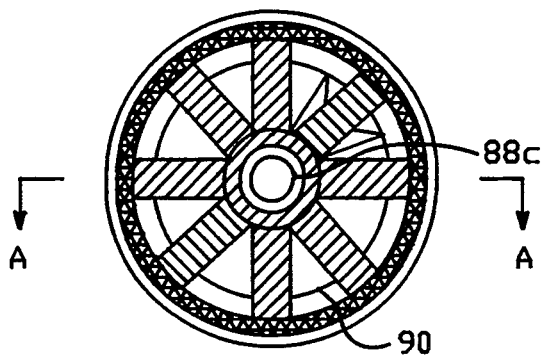
FIG.—4A
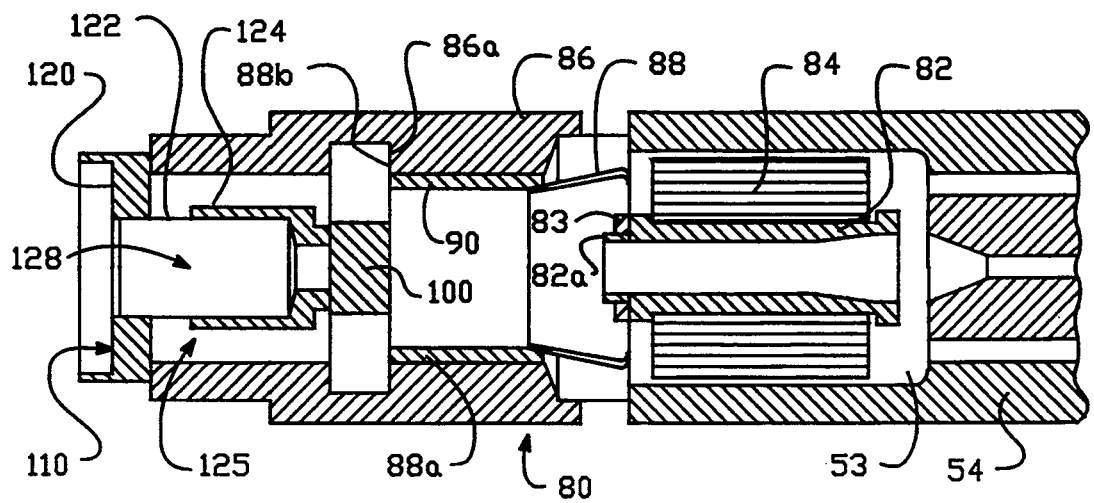
FIG.—4B

HYBRID COOLED ION LASER

CROSS-REFERENCE TO RELATED APPLICATIONS

THIN FILM DIELECTRIC COATING FOR EASER RESONATOR, U.S. patent application Ser. No. 07/987,960, filed Dec. 7, 1992, inventors Marc von Gunten, Donald Curry, Jasbir Rajasansi, Hakchu Lee, assigned to the assignee of the instant application.

METHOD FOR MANUFACTURING RESONANT CAVITY FOR LASER, U.S. patent application Ser. No. 07/950,415, filed Sep. 23, 1992, inventor William Shull, assigned to the assignee of the instant application.

Each of the aforementioned applications is specifically incorporated by reference.

BACKGROUND OF THE INVENTION

1. Field of the Invention

The invention relates to lasers and specifically to a high power laser structure using a unique cooling structure.

2. Description of the Related Art

Conventional ion lasers include a resonant cavity defined by a series of two reflecting optical elements placed at either end of a laser tube. One of the elements usually comprises an output coupler. In general, the optical elements are externally connected to the laser tube; that is, the mirrors are mounted directly to the ends of the tube, with a glass frit, or solder glass joining the reflective portion of the element directly to the end of the laser tube.

Another laser design incorporates optics not mounted directly to the tube, but mounted to a separate external support structure, which supports both the tube and the optics. Such a prior art design is shown in FIG. 1, and includes laser tube 11, including a bore 12, manufactured from a ceramic material such as beryllia (BeO) and a cooling assembly 17, mounted in a support structure 14. A magnet assembly 21 may also be provided to help concentrate laser discharge at the center of bore 11. Mirrors 15,16 are mounted and supported at either end of laser tube 11 in support structure 10. While structures such as support structure 14 allow for relatively easy adjustment of optics 15 and 16, they are relatively complicated to manufacture, requiring great precision, and can be problematic over time due to mechanical deterioration.

U.S. Pat. No. 4,893,314, inventors Shull, et al., assigned to Spectra-Physics, Inc., shows an optics mounting alternative wherein the laser optics are mounted to a mounting assembly which is itself coupled in the ends of the laser bore. A mirror seat is inserted into the interior of the laser bore at each respective end and the optical element is mounted on the mirror seat with the reflective portion of the element on the opposite side of the mounting area. As discussed in detail in co-pending application Ser. Nos. 07/950,415 and 07/987,960, this particular mounting structure presents a number of advantages over the external mirror mount structure shown in FIG. 1.

The optical elements for a laser resonator may be manufactured by coating a substrate, such as glass, with a series of dielectric films to develop the desired reflectance/transmittance of the mirror, depending on whether the mirror is to be used as a high reflectance mirror or as an output coupler. As is well known, such coatings are generally comprised of a plurality of layers of dielectric material, the layers in a reflective stack alternating between materials with high and low indices of refraction with each layer being typically about $\lambda/4$ in optical thickness, thereby defining a reflective surface.

In ion lasers where a "white light" output is desired, laser operation over a broad range of wavelengths—the red, green and blue visible regions of the spectrum—is required, thus necessitating that the optical elements reflect and transmit over this broad range. High power white light lasers (having on the order of one watt output power) are useful in applications such as artistic laser light displays, wherein the beam will be split into its spectral components to make multi-colored designs.

In general, to generate sufficient output power, input power several hundred times the desired output power is required to produce the desired output. For example, it is generally necessary to provide as much as 3–8 kilowatts of input power to generate 1–2 watts of visible laser light. In such high energy lasers, much of this energy is dissipated in the form of heat and thus cooling the laser becomes a significant design concern. Generally, circulating air over the laser bore provides sufficient cooling only in low power applications. For high power lasers, cooling using a recirculating coolant is generally required.

As shown in FIG. 1, water cooling generally involves surrounding the exterior portion of the laser tube with a sealed sheath to allow water to flow along the exterior of the ceramic bore in direct contact therewith. Water generally circulates over the bore to remove heat therefrom and to transmit the heat to a heat exchanger. Because water flows directly over the bore, in contact therewith, it is preferable to have a tube manufactured from a solid piece of ceramic material. Tube 12, shown in FIG. 1, is of the type conventionally used with a noble gas ion laser. Tube 12 is generally filled with a gas such as argon, krypton, or a combination thereof, and has a first end 13a, where an anode A is generally located and a second, larger end 13b, where a cathode assembly C is located. Second end 13b also serves as a gas reservoir.

Cooling assembly 17 includes a coolant inlet 17a and coolant outlet 17b, which surrounds both the narrow portion of laser bore 12 and the cathode portion 13b. O-rings 19 are provided at each end of the bore to seal the sheath 18. When using water cooling with bore 12, safety and reliability problems may develop if there is interaction between the water and the electrical couplings due to deterioration of the seals 19 adjacent anode A and cathode C. The materials used to seal the laser tube tend to deteriorate over time allowing water coolant to interact with the anode or cathode, resulting in electrolysis and even loss of vacuum integrity.

Further, while it is preferable to have a single piece ceramic bore 12 and cathode reservoir volume 13b, such tubes are extremely costly to manufacture.

In a one-piece ceramic tube, the ceramic material must be formed to a diameter sufficient to encompass the gas reservoir region 13b. The internal bores and exterior surface are then machined to achieve the shape depicted in FIG. 1. Two-piece tubes–with a ceramic, narrow bore 13a and a ceramic or metallic reservoir region 13b—have been developed to reduce the costs associated with manufacture a single piece bore. With a two-piece tube, a bore region and a reservoir region are joined at a junction 23. However, sealing this joint is problematic when developing reliable, high power, water cooled lasers.

SUMMARY OF THE INVENTION

The invention comprises a high output laser having a multi-line spectral output, also known as a white-light output. The laser structure is integral to providing a highly reliable, compact, high output design capable of delivering output power on the order of 1-4 watts.

The laser structure comprises a laser tube having a resonant cavity, an output coupler and an active medium. A power supply and coolant assembly are coupled to the laser tube. In accordance with the invention, the coolant assembly is a hybrid coolant scheme wherein one portion of the tube is cooled by circulating water coolant, while another portion or portions are cooled by circulating air. In one aspect, the laser tube includes a bore region and a reservoir region. The bore region includes a ceramic bore surrounded by a sheath. The sheath is sealed at a first end and a second end of the ceramic bore and coolant is provided between the sheath and the bore. In a further aspect, forced air is directed over the reservoir portion of the tube.

The reservoir portion may be manufactured from a metallic alloy comprised of nickel-iron-cobalt, resulting in specific advantages in terms of cooling and fabrication cost for the tube in comparison to tubes manufactured entirely from ceramic material. Copper cooling fins are brazed to the reservoir to increase thermal cooling and provide an isothermal temperature profile.

In a further aspect of the invention, the anode comprises a part of an integral anode assembly which includes an optical mount assembly and copper anode mounted in a housing attached to one end of the tube. The copper anode is placed in a cavity in the ceramic bore and is provided with copper heat fins to thermally couple the copper anode to the ceramic material so that heat generated by the anode is removed by the circulating coolant. While the copper anode is in a region of the bore with circulating coolant thereabout, the housing and optical mount are located outside of the water sheath and have forced air directed thereabout.

In still another aspect of the invention, an internal mirror, integral resonator design is incorporated in the above aspects and yields a highly compact, and reliable overall laser design.

The laser of the present invention provides the specific advantages of cost efficiency, reliability in a high power laser structure, and compactness. In addition, the hybrid material scheme of a ceramic bore coupled to a metallic reservoir region, with the junction between these two components lying outside of the coolant flow, reduces the possibility for problems in operation through electrolysis or other seal degradation.

BRIEF DESCRIPTION OF THE DRAWINGS

The invention will be described with respect to the particular embodiments thereof. Other objects, features, and advantages of the invention will become apparent with reference to the specification and drawings in which:

FIG. 3 is a cross-sectional view of a laser tube in accordance with the present invention.

FIG. 4 is an enlarged view of the anode assembly used in conjunction with the tube shown in FIG. 3.

FIGS. 4A and 4B are views along lines AA and BB, respectively, of the anode assembly as shown in FIG. 4.

DESCRIPTION OF THE PREFERRED EMBODIMENT

In accordance with the present invention, a gas ion laser is disclosed wherein a two-piece, two material, laser tube may be utilized in conjunction with a hybrid cooling scheme to achieve a reliable, cost efficient, white light laser.

Figure 1:
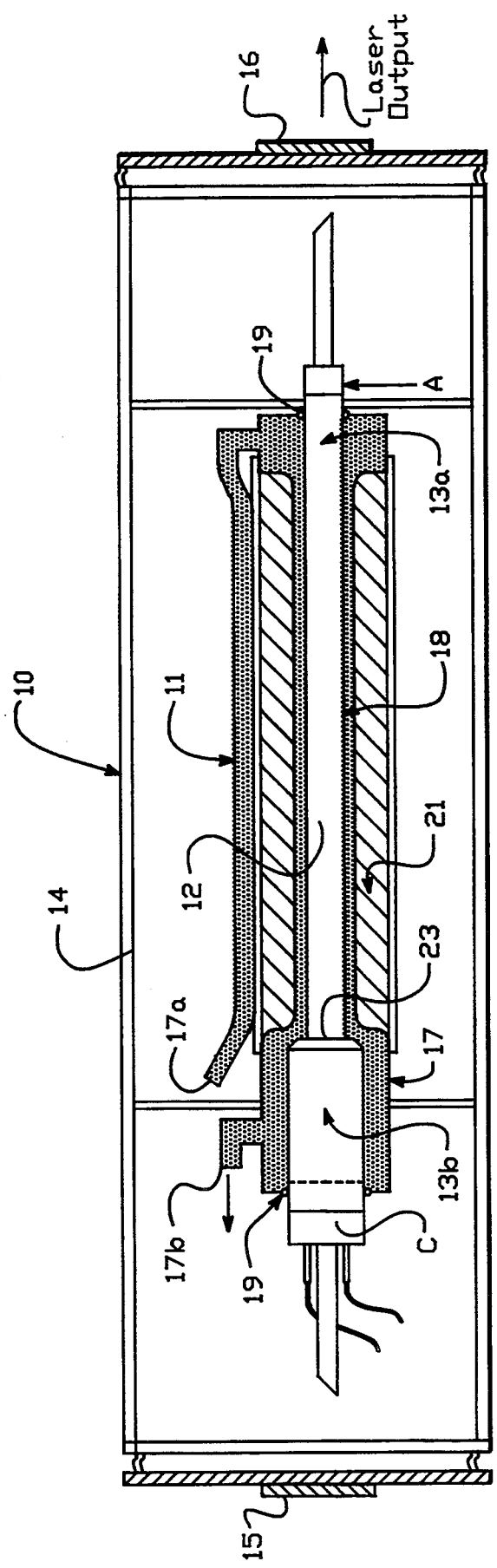
FIG. 1 is a depiction of a prior art ion laser employing externally mounted laser optics and water cooling.
Figure 2:
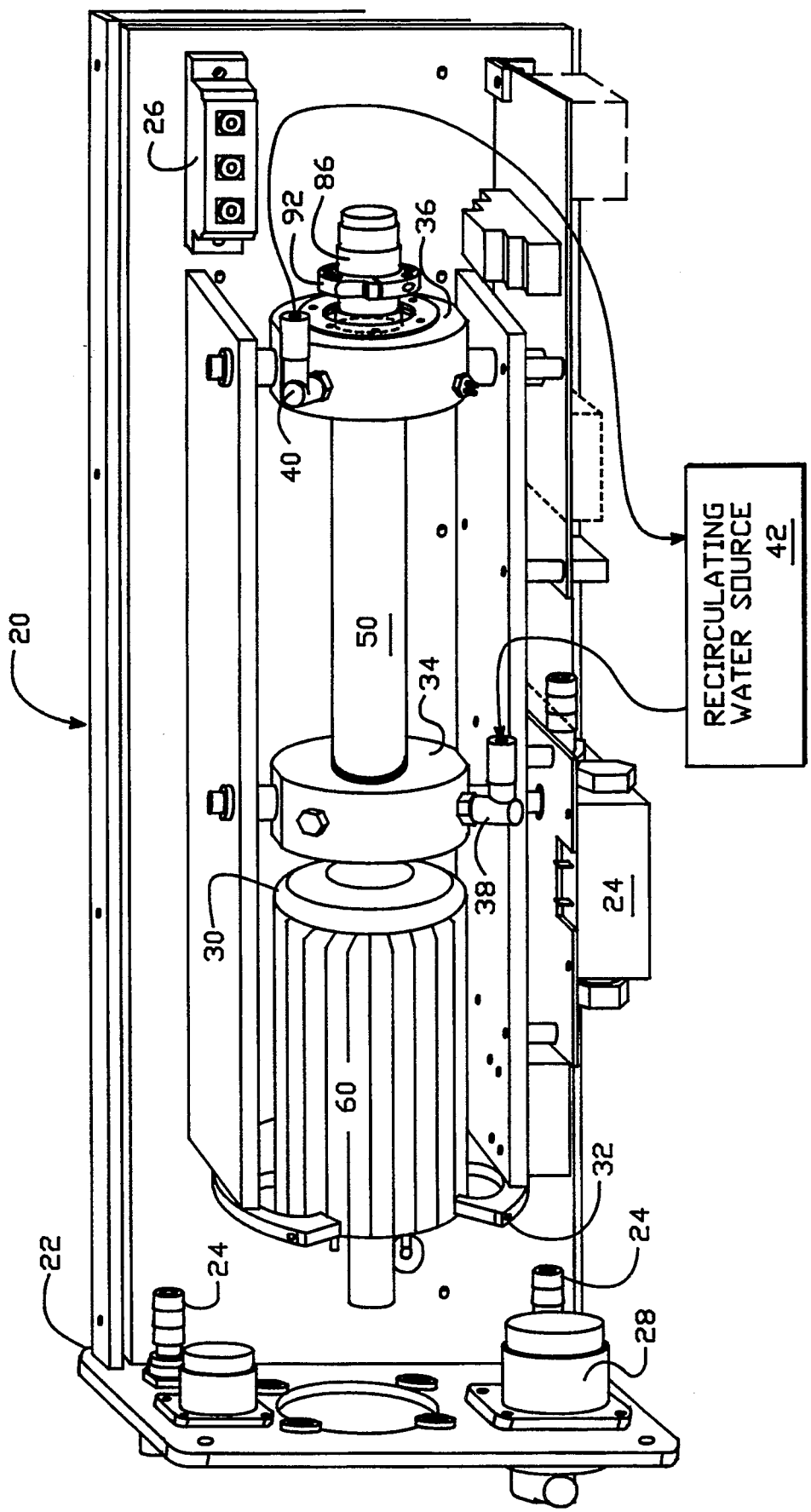
FIG. 2 is perspective, cutaway view of a laser in accordance with the present invention.

FIG. 2 is a cutaway view of a laser 20 in accordance with the present invention. Shown partially is a housing 22 in which is mounted a laser tube 30. Housing 22 includes: fittings 24 which may be utilized to couple external water flow to tube 30; a bank 26 of control switches which may be coupled to the power supply 24 of laser 20; and frames 39a, 39b for securing couplings 32,34,36 in housing 22. Fittings 38, 40 may be attached to couplings 34 and 36, respectively, and to a recirculating water source 42 to provide recirculating coolant to laser tube 30, and specifically bore portion 50 of laser 30 (shown in FIG. 3). A fan assembly 28 is shown which directs air over tube 30 and, in particular, reservoir portion 60 of bore 30. This combination of air and water cooling comprises the hybrid cooling scheme which effectively cools high output laser 20.

As will be generally understood by those skilled in the art, tube 30 is filled with a noble gas and energized by an anode and cathode (FIG. 3) to provide laser light. Conductors (not shown) connect power supply 24 to the cathode and anode.

Shown in FIG. 3 is a cross-section of tube 30 suitable for use in accordance with laser 20 of the present invention. As shown therein, tube 30 includes a bore portion 50 and a reservoir portion 60. Bore portion 50 is generally comprised of a ceramic bore 52 and water sheath 58. A ceramic material such as beryllia (BeO) is suitable for use in bore 52. In accordance with the invention, reservoir portion 60 is comprised of a metallic alloy, preferably a nickel-iron-cobalt alloy (NiFeCo) such as Kovar, manufactured by Westinghouse Corporation. The use of the NiFeCo alloy is integral to the stability and cooling scheme of laser 20. Reservoir portion 60, serves as a gas reservoir and houses a cathode assembly 70 therein. An anode assembly 80 is included in the opposite end of bore portion 50.

Bore portion 52 includes a central 0.060" diameter through-channel 54 and eight (8) gas recirculation channels 56. As is well known in the art, ceramic material is used in the bore because of its high thermal conductivity and low expansion rate. This allows the laser action to be maintained in a precise environment even during the exceedingly high temperatures reached in the central through-channel 64.

Bore 52 is surrounded by a water sheath 58 manufactured from brass or stainless steel. A helical flow diverter 55 is placed in cavity 59 between the exterior surface of bore 52 and sheath 58 to ensure circumferential movement of the coolant flow over the exterior surface of central bore 52. Couplings 34 and 36 include bores 35 and 37 which feed directly through to cylindrical cavity 59.

Cavity 59 is sealed at each end of bore portion 50. O-rings 43, 44 are provided at coupling 34, and O-rings 45, 46 are provided coupling 36. End cap rings 31, 33 are secured at each end of bore portion 50 to couplings 34,36, respectively.

Reservoir portion 60 is a two-piece structure comprising housing 66 and end cap 68. Housing 66 has a diameter which exceeds the diameter of bore portion 50, but is tapered at one end so that one side of housing 66 slips over a second end of bore portion 50 at joint 62, is secured to bore 52 by brazing, and sealed by end cap ring 33. Copper cooling fins 64 are also brazed to the exterior of housing 66 of gas reservoir 60.

In the laser 20, the laser optics are mounted directly to tube 30 by mirror seats and thus laser 20 has a true internal mirror, integral resonator configuration. As shown in FIG. 3, optical elements 100,102 are mounted in mirror mount assemblies 110,112, respectively, at the opposite ends of tube 30 adjacent to anode 80, and cathode assembly 70, respectively. The optical mount structure is equivalent to the structure taught in U.S. Pat. No. 4,893,314.

Optic mount assembly 112 and cathode assembly 70 are mounted in reservoir region 60 after subassembly in conjunction with header plate 68. Plate 68 is welded into the end of housing 66 to form a sealed environment therein. Cathode assembly 70 includes cathode 72 and tungsten leads 74,76 which extend through end cap 68 to the exterior of laser tube 30 to allow the laser's power supply to be coupled thereto. Optic mount assembly 112 includes housing 114 and mirror seat 116. Housing 114 includes a channel 118 to allow laser energy to optic 102. In accordance with the teachings of application Ser. No. 07/950,415, optic element 102 is fabricated by applying dielectric films to one side of the substrate and thereafter securing the opposite side of the substrate to mirror seat 116. The side of element 102 opposite the coatings generally includes an anti-reflective coating which is not affected by the first process used to secure the element to seat 116. Mirror seat 116 is comprised of a first length 115$a$ and a second length 115$b$ of tubing. Element 102 is attached to second length 115$b$ of seat 116. Seat 116 is thereafter welded to housing 114 and housing 114 secured in end cap 68. Alternatively, end cap 68 and housing 114 may be fabricated as a single, integral piece. An insulator wheel 78 is secured to one end of housing 114 to support leads 74,76. Leads 74 and 76 may be cast in insulator wheel 78 and coil 72 thereafter secured thereto by connectors 73$_1$, 73$_2$. Once the entire cathode assembly 70 and optical mount assembly 112 is secured in cap 68, cap 68 may be welded to reservoir housing 66.

Anode assembly 80 will be described in detail with reference to FIGS. 4, 4A and 4B. Anode assembly 80 includes anode 82, cooling fins 84, anode housing 86, connector 88 and retainer ring 90. Anode 82 is comprised of copper and is placed in a cavity 53 in bore 52. Copper cooling fins 84 are attached to anode 82 brazing, and engage the interior of cavity 53 to provide thermal conduction with the ceramic material comprising central bore 52. As will be noted by reference to FIG. 3, this allows anode 82 to be cooled by the circulating coolant, while maintaining anode 82 in a buried fashion in bore 52. This buried anode configuration reduces the potential for interference between a leaking recirculating coolant seal by isolating the anode from the coolant at the exterior of bore 52, but allows the structure to retain the beneficial effects of recirculating coolant to cool anode 82. The fact that the heat is removed through the ceramic via the coolant eliminates the problem of electrolysis.

Anode assembly 80 is electrically coupled to power supply 24 by an electrical conductor (not shown) from power supply 24 to connector ring 92, shown in FIG. 2, secured to housing 86. Anode 82 is electrically coupled to housing 86 by a spider connector 88. Spider connector 88 is shown in FIGS. 4A and 4B in cross-section, and in FIG. 4 in perspective. Connector 88 initially comprises a generally flat, fingered copper sprocket of 0.010" thickness with a central hub 88$c$ and fingers 88$a$ extending therefrom. When secured in anode assembly 80, each of fingers 88$a$ is bent as shown in FIGS. 4 and 4B so that a portion of each of fingers 88$a$ may be sandwiched between the inner wall of housing 86 and a metal retainer ring 90. Both connector 88 and ring 90 are manufactured out of copper. Retainer ring 90 is press fit into the interior of housing 86 to sandwich spokes 88$a$ between ring 90 and the interior of housing 86 to secure spider connector 88. Fingers 88$a$ are also bent to form a lip 88$b$ which engages ledge 86$a$ in housing 86 to prevent movement of spider connector 88 once secured in housing 86. Hub portion 88$c$ of spider connector 88 slips over one end 82$a$ of anode 82 and a washer 83 secures spider connector 88 to anode 82. Generally, anode assembly 80 is pre-assembled such that housing 86, connector 88, ring 90 and anode 82 form an integral subassembly which is secured to the end of bore 52.

Optical mirror assembly 110 includes a base portion 120 which holds a first length 122 and a second length 124 of mirror seat 125. As with seat 116 and optical element 102, element 102 is fabricated in accordance with the structure and process set forth in U.S. patent application No. 07/987,960, wherein a series of dielectric coatings are disposed on one side of a substrate, with an anti-reflective coating provided on the opposite side of the substrate. Optical element 100 is secured to the second length 124 of mirror seat 125 by a glass frit between the side of the substrate having the anti-reflective coating and second length 124. In accordance with U.S. Pat. No. 4,893,314, once optical element 100 has been attached to seat 125, the optical element may be adjusted by a tool which is inserted into channel 128. Base 120 is welded to anode housing 86 after seat 125 and element 100 have been assembled. Mirror seat 112 may be adjusted in a like manner.

As should be readily understood by one of average skill in the art, once the laser power supply coupled to anode assembly 80 and cathode assembly 70 is activated, a high-current discharge, concentrated in the bore, serves to ionize the gas and provide the energy that excites the ions to upper laser levels, generating oscillation between the laser optics. A power supply providing 2–10 Kw of input power is suitable for use with laser 20. The excited plasma is extremely hot, with the greatest concentration of heat exhibited at the end of the bore adjacent cathode 70. Generally, there is a lesser associated heat at the end of the bore adjacent to anode 80.

Careful design of the heat transfer and temperature profile of both bore portion 50 and reservoir portion 60 have produced a high power laser which is mechanically stable enough to match or exceed the performance of external mirror laser systems. The ceramic which comprises bore portion 50 is a material with a high degree of thermal conductivity. Approximately 90% of the input power is dissipated in bore 50, and thus use of this material allows temperature gradients across the diameter of the bore to be held to minimal values. Because the gas reservoir 60 forms part of the laser mirror structure, temperature gradients across the diameter of the reservoir 60 must be minimized also. It is thus desirable to minimize the thermal expansion of the gas reservoir. The alloy employed in construction of gas reservoir 60 has a thermal expansion of 5.0 parts per million per degree centigrade. Copper heat fins 64 brazed to the reservoir 60 provide heat dissipation for both the cathode excitation and the cathode fall power. Cathode fall power is defined as the voltage drop from the cathode 72 to the end 61 of bore 50. This combination of the metallic alloy and copper forms a low expansion structure with high thermal conductivity and allows the reservoir portion 60 to be cooled using forced air while maintaining high angular stability required for the laser mirrors. Anode 82 also contributes to the heat loading of the plasma tube. This component dissipates heat at the rate of about 10 watts per amp of DC discharge current—about 200–400 watts of heat. The heat load in the cathode region is about 100 watts for the cathode excitation and 200–400 watts for the cathode fall power.

As shown in FIG. 3, the cooling structure for the laser 20 of the present invention is a hybrid scheme. That is, main bore portion 55 is cooled by circulating water fluid over the length thereof, while forced air is used over reservoir portion 60. While O-rings 43 and 46 prevent the recirculating fluid from engaging either the interface between anode 80 and bore 50, or the interface between the reservoir portion 60 and bore 55, the buried nature of anode 82 substantially decreases chances for coolant electrification and electrolysis. In addition, because reservoir portion 60 is manufactured from a metallic alloy, a braze may be provided at the seal point between reservoir 60 and bore 50, but no electrolysis problems are likely to occur because the braze is outside the coolant flow region. As such, only the main, hottest part of the laser—bore 55—is cooled by the recirculating fluid. Because heat occurs at the anode 82, this region is sufficiently cooled by placing the anode 82 in thermal contact with bore 55 and thermally isolating anode 82 with thin copper fingers 88a. It is noteworthy that the heat conducted via spider connector 88 to housing 86 and optic assembly 110 may be cooled by forced air cooling as heat at this region is significantly less than at anode 82 or bore 50. As such, there is little danger that the water in the recirculating coolant flow will impinge or degrade the seals) at either end of bore 50.

When a 4 Kw power supply is used in conjunction with the optics disclosed in co-pending application Ser. No. 07/987,960 and the laser structure of the present invention, a multi-line or "white light" laser output may be achieved with about 1 watt of output laser light using an argon/krypton gas mixture at about 1.2–1.6 torr. In such configurations, the length of bore 50 is typically 7.2", with a diameter of 0.951", while the length of the housing is approximately 5.4", and the diameter of housing 66 is about 2.7". A second embodiment of laser 20 may include a bore length of 17", having a 0.960" diameter using a power supply of 8–10 Kw.

The many features and advantages of the present invention will be apparent to those of average skill in the art. The laser structures of the present invention allows for an internal mirror, integral laser resonator structure with a decreased potential for long term defects or degradation. The advantages are provided through the use of a hybrid cooling scheme in conjunction with a buried anode structure and two-piece tube assembly. Numerous variations are readily apparent to those of average skill in the art. These advantages and features, and those readily apparent to those of average skill in the art, are intended to be within the scope of the invention as defined in the instant specification, the drawings and the claims.

What is claimed is:

1. A high powered laser, comprising:
   a laser tube containing a resonator mirror and an output coupler defining a resonator cavity, said tube containing an active medium and said laser tube having a first end defining a first section of said laser tube, and a second end defining a second section of said laser tube;
   a first cooling device coupled to a first section of the laser tube made of a ceramic material that has a greater efficiency for removing heat in a high temperature environment than a non-ceramic material, the first section of said laser tube operating at a high temperature, the first cooling device including a circulating liquid coolant to cool said first section;
   a second cooling device for cooling, provided to a second section of the laser tube made of non-ceramic material, said second section operating at a lower temperature than the high temperature of the first section of said laser tube, the second cooling device operating substantially by circulating air; and
   a power supply coupled to the laser tube.

2. The laser of claim 1 wherein the laser further includes an anode and a cathode positioned in the laser tube, the anode being positioned in the first section and the cathode being positioned in the second section of the laser tube.

3. The laser of claim 2 wherein the first section of the laser tube comprises a laser bore portion and the second section of the tube comprises a gas reservoir.

4. The laser of claim 3 wherein a portion of the anode is in thermal contact with the bore and the circulating liquid coolant, and a portion of the anode is in contact with the circulating air.

5. The laser of claim 3 wherein a first optical element mounted on an optical seat in the interior of the bore; and
   a second optical element mounted on an optical seat in the interior of the gas reservoir.

6. The laser of claim 3 wherein the bore portion is comprised of a ceramic bore surrounded by a liquid coolant sheath.

7. The laser of claim 6 wherein the reservoir is comprised of a metallic alloy.

8. The laser of claim 3 wherein the bore is manufactured from beryllia and the gas reservoir is manufactured from a nickel-iron-cobalt alloy.

9. The laser of claim 3 wherein the bore section includes a first end and a second end wherein the first end includes an anode mounted therein and the second end is attached to the gas reservoir.

10. The laser of claim 9 wherein the anode is secured in a cavity in the first end of the ceramic bore.

11. The laser of claim 9 wherein the anode is manufactured from copper and includes copper cooling fins brazed thereto such that the cooling fins engage the ceramic bore when the anode and fins are placed in a cavity in the bore.

12. The laser of claim 9 wherein the first cooling device for cooling comprises a cylindrical fluid cooling sheath, sealed at a first end and a second end of the bore portion.

13. The laser of claim 3 wherein the second cooling device for cooling comprises a plurality of copper cooling fins brazed to the exterior surface of the gas reservoir, and a source of forced air incident on the cooling fins.

14. A hybridly cooled high power gas laser, comprising:
a laser tube including an anode, a cathode, a bore that operates at a high temperature, a gas reservoir that operates at a lower temperature than the high temperature of the bore, and optical elements positioned in first and second ends of the tube to define a resonator cavity that produces an output of laser energy, said tube containing an active medium;
a liquid coolant system coupled to the bore; and
an air cooling system directing forced air over the gas reservoir.

15. The laser of claim 14 wherein the anode is provided in a cavity at one end of the bore.

16. The laser of claim 15 wherein the liquid coolant system comprises a sheath surrounding the bore and sealed at a first and second ends of the bore, the sheath including fittings allowing circulating coolant to enter a region between the bore and the sheath.

17. The laser of claim 16 wherein the air cooling system includes a source of forced air directing the air over the reservoir portion at the second end of the bore and over a portion of the anode at the first end of the bore.

18. A high energy laser, comprising:
a laser tube, the laser tube comprising:
a gas reservoir having an exterior surface and being comprised of a metallic alloy,
a laser bore that operates at a high temperature, comprised of ceramic and coupled to the gas reservoir which operates at a lower temperature than the high temperature of the bore,
an anode assembly coupled to a first end of the bore,
a cathode mounted in a second end of the tube, and,
first and second optical elements mounted in the first and second ends of the tube defining a resonator that produces a laser output;
a power supply coupled to the anode and cathode;
a coolant flow tube surrounding the laser bore, sealed at a first end and a second ends of the tube, and coupled to e source of recirculating coolant;
metallic cooling fins coupled to the exterior surface of the gas reservoir; and
a source of forced air directed over the cooling fins and a portion of the anode assembly.

19. The laser of claim 18 wherein the anode assembly includes
a copper anode mounted in a cavity in the first end of the bore;
a housing mounted to the first end of the bore; and
a connector between the housing and the copper anode.

20. The laser of claim 19 wherein the anode assembly further includes an optical mount assembly coupled to the housing, the first optical element being coupled to the optical mount assembly.

21. The laser of claim 20 wherein the optical mount assembly includes
a mirror seat, the first optical element being coupled to the mirror seat; and
an end cap for coupling the mirror seat to the housing.

22. The laser of claim 18 wherein the gas reservoir is positioned at the second end of the tube, the cathode is mounted in the gas reservoir, and an optical mount assembly is mounted in the gas reservoir with the second optical element mounted thereto.

23. A high energy laser, comprising:
a tube, having a bore that operates at a high temperature, and a gas reservoir that operates at a lower temperature than the high temperature of the bore;
an anode mounted in one end of the bore;
a cathode mounted in the gas reservoir;
a recirculating water cooling system coupled to the bore;
a device for supplying circulating air over the reservoir region;
a first optical element mounted on an optical seat in the interior of the bore; and
a second optical element mounted on an optical seat in the interior of the gas reservoir.

24. The laser of claim 23 wherein a gas is provided in the laser tube, the gas comprising a mixture of argon and krypton.

25. The laser of claim 24 wherein a power supply is coupled to the anode and the cathode, and recirculating coolant in the cooling system does not engage a junction between the bore and the gas reservoir.

26. The laser of claim 25 wherein the laser provides a multiple spectral line, white light output when the power supply is energized.

27. The laser of claim 25 a first optical element is mounted on an optical seat in a stainless steel or Kovar anode housing at said one end of the bore; and
a second optical element mounted on an optical seat in the interior of the gas reservoir.

28. The laser of claim 23 wherein a portion of the anode is in thermal contact with the bore and the recirculating water, and a portion of the anode is in contact with the recirculating air.

* * * * *